US010430261B2

United States Patent
Farkas et al.

(10) Patent No.: US 10,430,261 B2
(45) Date of Patent: Oct. 1, 2019

(54) DETECTING A GUEST OPERATING SYSTEM CRASH ON A VIRTUAL COMPUTING INSTANCE

(71) Applicant: VMware, Inc., Palo Alto, CA (US)

(72) Inventors: Keith Farkas, San Carlos, CA (US); Kevin Scott Christopher, Sunnyvale, CA (US); Aalap Desai, Sunnyvale, CA (US); Manoj Krishnan, Sunnyvale, CA (US); Jesse Andrew Mendonca, Belmont, CA (US); Rohan Patil, Pittsburgh, PA (US)

(73) Assignee: VMware, Inc., Palo Alto, CA (US)

( * ) Notice: Subject to any disclaimer, the term of this patent is extended or adjusted under 35 U.S.C. 154(b) by 171 days.

(21) Appl. No.: 15/677,691

(22) Filed: Aug. 15, 2017

(65) Prior Publication Data

US 2019/0056985 A1   Feb. 21, 2019

(51) Int. Cl.
| | |
|---|---|
| *G06F 11/00* | (2006.01) |
| *G06F 11/07* | (2006.01) |
| *H04L 12/24* | (2006.01) |
| *G06F 11/14* | (2006.01) |
| *G06F 9/455* | (2018.01) |
| *H04L 12/26* | (2006.01) |

(52) U.S. Cl.
CPC ...... *G06F 11/0712* (2013.01); *G06F 9/45558* (2013.01); *G06F 11/0778* (2013.01); *G06F 11/1438* (2013.01); *H04L 41/0654* (2013.01); *G06F 9/45545* (2013.01); *G06F 11/0754* (2013.01); *G06F 11/1484* (2013.01); *G06F 2009/45591* (2013.01); *H04L 43/10* (2013.01)

(58) Field of Classification Search
CPC ............ G06F 11/0712; G06F 11/0778; G06F 11/1438; G06F 11/0754; G06F 11/1484; G06F 11/0793; G06F 11/301; G06F 9/45558; G06F 209/45591; G06F 2009/45591; G06F 9/45545; H04L 41/0654; H04L 43/10

See application file for complete search history.

(56) References Cited

U.S. PATENT DOCUMENTS

| | | | | |
|---|---|---|---|---|
| 2008/0270825 | A1* | 10/2008 | Goodson ............. | G06F 11/1471 714/5.11 |
| 2010/0162052 | A1* | 6/2010 | Shimogawa ........ | G06F 11/3476 714/48 |
| 2011/0246986 | A1* | 10/2011 | Nicholas ............. | G06F 11/0712 718/1 |
| 2014/0115575 | A1* | 4/2014 | Chand ................. | G06F 9/45558 718/1 |
| 2015/0161008 | A1* | 6/2015 | Antony ............... | G06F 11/1448 714/16 |
| 2017/0300371 | A1* | 10/2017 | Soffer ................. | G06F 11/0709 |
| 2018/0336085 | A1* | 11/2018 | Hammer ............. | G06F 11/0778 |

OTHER PUBLICATIONS

"Statement Relating to Private Beta", VMware, Inc., Aug. 11, 2017, 1 page.
Unknown, "Hyper-V Architecture", https://msdn.microsoft.com/en-us/library/cc768520.aspx.

* cited by examiner

*Primary Examiner* — Joseph D Manoskey (57) ABSTRACT

The subject matter described herein is generally directed towards detection and remediation of virtual computing instance (VCI) failure on host devices. Monitoring is performed to detect suspected failures of different guest operating systems, identify failure information, and perform remediation to provide high availability for the VCI.

17 Claims, 7 Drawing Sheets

DETECTING A GUEST OPERATING SYSTEM CRASH ON A VIRTUAL COMPUTING INSTANCE

BACKGROUND

Existing systems use virtualization to share the resources of a modern datacenter. The datacenter may have a wide range of hardware components such as servers, storage devices, communication equipment, and the like, organized into clusters. Virtualization of the datacenter allows multiple guest operating systems to run in virtual machines (VMs) on a single host, sharing the underlying physical hardware of the host, as well as sharing access to a datastore accessible to the host.

Some existing systems include monitoring features that restart individual VMs if expected communications (e.g., "heartbeats") are not received within a configurable time window. Inputs and outputs (I/Os) are further monitored for another configurable time window to determine whether the VM is in an operational state. If no I/Os are detected, a failure is presumed and the VM is reset to remediate the failure.

Because the monitoring features of these existing systems are often deeply integrated with VM heartbeating processes, there is no definitive way to determine whether the guest operating system (OS) has crashed or whether the VM heartbeating process has crashed. As a result, decisions to remediate failures may be based on potential false positive failures when the guest OS is still operational, but the VM heartbeating process has crashed. Additionally, the time taken to remediate the failure using the heartbeating and I/O monitoring cycles takes a significant amount of time.

BRIEF DESCRIPTION OF THE DRAWINGS

The present description will be better understood from the following detailed description read in the light of the accompanying drawings, wherein.

DETAILED DESCRIPTION

The systems described herein provide virtual computing instance (VCI) monitoring and remediation workflows for guest operating system (OS) crashes. The VCIs, such as virtual machines (VMs), containers, or other processes or applications, run on host devices (i.e., hosts) in a datacenter cluster coordinated by a datacenter virtualization infrastructure (DVI). In a VMware, Inc. platform example, the DVI is vSphere® that provides a platform for datacenter virtualization by managing ESXi® hypervisors on ESX® hosts. The present disclosure addresses situations where one or more VCIs executing on the hosts become non-functional, such as during a VCI OS crash or other failure. Upon such an event being detected, depending upon a policy set by an administrator or customer, remediation is performed. For example, the affected VCIs may be shut down, rebooted, migrated, or have another remediation action performed.

Continuing with the VMware, Inc. platform example, guest OS operation is monitored by a vSphere® infrastructure having vSphere® High Availability (HA) Listeners executing on the host so that, based on pre-configured HA policies, vSphere® HA performs specific actions to the VCI to remediate the guest OS crash for that VCI. Using various configurations described herein, guest OS crashes are more quickly detected and remediated. For example, a crash detector is operable on a VMware ESXi® Hypervisor, or otherwise executes on the VCI, to monitor the guest OS for crashes and core dumps across various OSs, including Windows®, Linux® and Apple Mac®. The core dump represents a system dump, kernel dump, or any other data saved by an OS when an OS crashes.

In contrast with existing systems that use heartbeating in combination with I/O monitoring to infer that a guest OS crash has occurred, aspects of the disclosure conclusively identify and store data (e.g., set a flag) corresponding to a crash event by utilizing more efficient workflows to verify that the crash event has occurred. The verification process, specific to each guest OS, monitors crashes and/or kernel dumps across the different guest OSs. Any crash information is posted for use by a high availability process in remediating the crash, which can be pre-configured to occur in a certain manner.

For example, in the vSphere® operating environment, the crash detector posts crash information to an associated host agent (e.g., Hostd) and a vSphere® HA agent on the VMware ESXi® Hypervisor listens to the updates posted by the host agent. The vSphere® HA may be configured to reset or reboot the VCI on detecting a crash, power off the VCI, or wait until the kernel dump has completed before taking any further action. In some examples, the vSphere® HA restores the VCI to a last known snapshot, thereby reverting the state of the VCI, including the guest OS and applications running within the VCI, to a last well known healthy state.

Thus, as part of the high availability configuration for a cluster of hosts, a user can select a VCI and specify whether or not the user wants guest OS crash monitoring enabled as described herein. The user can also choose different options for remediation, such as if the user wants to wait for the kernel dump to complete when the VCI encounters a guest OS crash. Thus, a user can choose different options for remediation. The user can also choose a snapshot that the user wants to restore for the VCI when the guest OS crash is detected. If no snapshot is chosen, the VCI is either reset or powered off based on the user's selection, or other policy.

In this manner, the disclosure is able to more quickly identify and verify that the VCI has crashed (e.g., guest kernel crash) using pre-configured rules in a policy. These rules can be differently configured for different OSs to efficiently provide a solution that addresses guest kernel crash monitoring and remediation for different OS environments as an alternative to, or in combination with, heartbeating from within the guest OS to the hypervisor. In one example, the crash detector gives priority to the crash verification of the present disclosure over the existing heartbeating methods. As should be appreciated, when a guest OS crash occurs, further guest level heartbeats will not be sent.

By monitoring the VCI using aspects disclosed herein, verification of crashes of VCIs can be detected in a significantly reduced amount of time, for example, in seconds rather than in minutes or hours because the workflow quickly confirms the crash without having to use multiple data points and a heuristic approach. With the verification process of various embodiments, both a lag time for verification of VCI crashes and the number of false positives that are detected are reduced.

In this manner, aspects of the disclosure improve the functioning of a device by detecting and verifying crashes faster, thereby improving the user experience. Additionally, less memory and network bandwidth are consumed for crash detection and verification.

Figure 1:
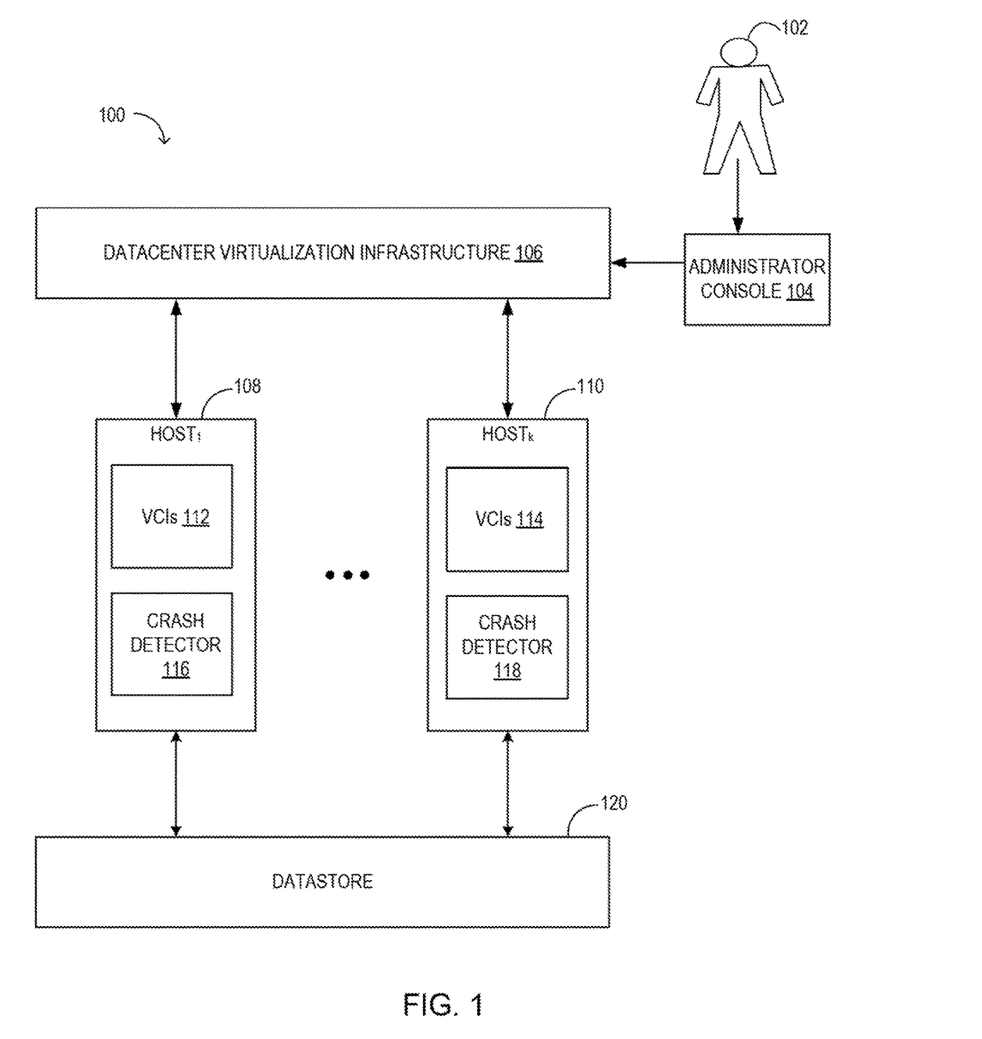
FIG. 1 illustrates a block diagram of a datacenter virtualization infrastructure (DVI) illustrating a plurality of host computing devices, hosted virtual computing instances (VCIs) each capable of running a guest operating system, and a datastore, according to an example embodiment.

FIG. 1 shows an exemplary block diagram of a DVI 106 in a virtualized computing environment 100 that includes a plurality of host computing devices, such as Host$_1$ 108 to Host$_k$ 110, and a plurality of VCIs, such as VCIs 112 and 114. An administrator 103 configures the DVI 106 via an administrative console 104, such as to set availability policies that define remedial actions that occur upon the detection of a failure.

Each of the hosts 108, 110 has a crash detector 116, 118. The crash detectors 116, 118 are agents or other processes executed by hypervisors on the hosts 108, 110 for detecting and verifying a failure (e.g., crash) of VCIs 112, 114 to improve the availability of VCIs 112, 114.

Each of the hosts 108, 110 is in communication with DVI 106 for the communication of management commands and other data between DVI 106 and the hosts 108, 110. Further, each of the hosts 108, 110 is in communication with a shared datastore 120, such as a Virtualized Shared Data Store (VSDS). The datastore 120 is any file system or any block or file based repository shared across one or more hosts in the cluster. The datastore 120 contains the data necessary for continued operation of the VCIs 112, 114. For example, if a VCI on one host is to be migrated to a recipient host, the recipient host also has access to the same shared data in datastore 120, and hence the VCI to be migrated continues to have access to the same data in datastore 120 on the recipient host.

Figure 2:
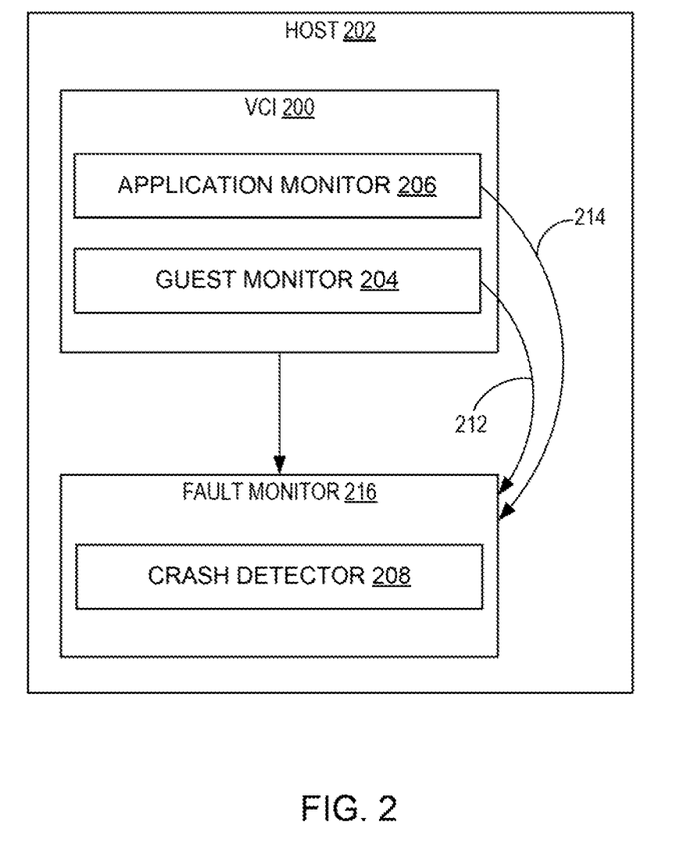
FIG. 2 illustrates a block diagram of a host computing device hosting a VCI with failure monitoring according to an example embodiment.

FIG. 2 shows a host 202 with various fault detection modules. A VCI 200, executing on host 202, includes a guest monitor 204 (e.g., an operating system level tool suite, such as VMware Tools® by VMware, Inc.) that can detect guest level failures (e.g., by regularly sending heartbeats via 214 to a fault monitor 216). The VCI 200 further includes an application monitor 206 that is configured to monitor one or more applications executing on the VCI 200 (e.g., by regularly sending heartbeats via 212 to the fault monitor 216). As described herein with respect to existing systems, in the absence of one or more heartbeats, the fault monitor 216 executes in a hypervisor to conclude, over time, that the VCI 200 has failed.

Alternatively, or in addition to these existing systems, the fault monitor 216 includes a crash detector 208. The crash detector 208 corresponds to crash detectors 116, 118 in FIG. 1. The crash detector 208 performs at least some of the operations described with respect to FIGS. 5, 6, and 7, depending in part on the OS of the VCI 200.

A failure or fault of VCI 200 may occur as a result of a fatal system error. Some OS versions issue a command to create a core dump in response to a crash. As described herein, the crash detector 208 detects these commands to infer that a crash has occurred. In other OS versions, failure screen display information may be displayed. This display information is commonly referred to as the Blue Screen of Death (BSoD), blue screen, Purple Screen of Death (PSoD) (for ESX® hosts), or purple screen, all of which represent an error screen displayed on a Windows® computer system after a fatal system error or crash in some OS versions. The BSoD is indicative of when the operating system reaches a condition where the system can no longer operate safely and remediation is needed. The crash detector 208 identifies that a BSoD has been displayed (and collects other crash conditions such as a core dump) to efficiently remediate the system crash. As described below, BSoD is just one example of failure screen display information; other types of failure screen display information are manageable by the present disclosure.

With the crash detector 208, failures are more reliably and quickly detected and remediated, than having to wait for the time-consuming heuristic process of using heartbeats. Further, false positives are reduced or eliminated.

Figure 3:
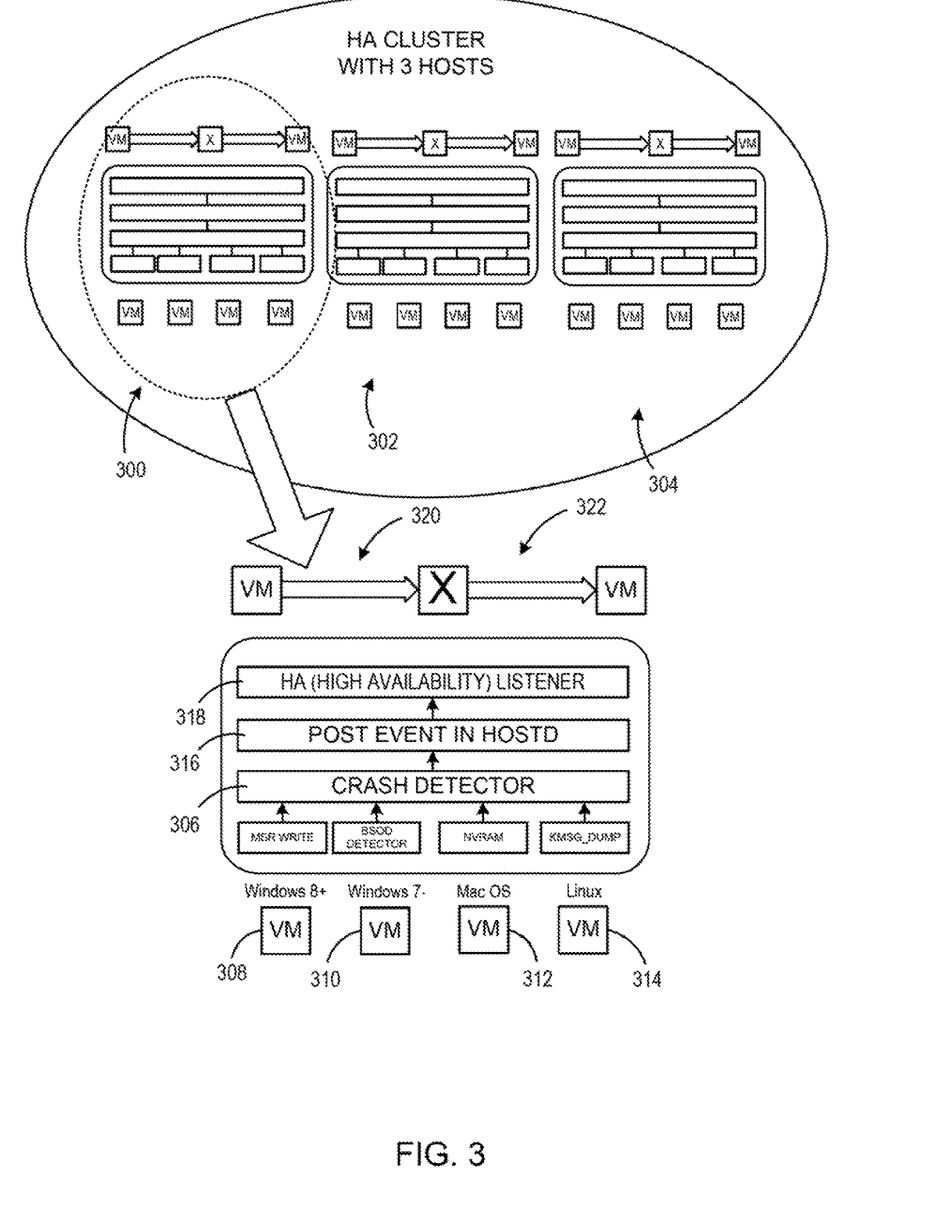
FIG. 3 illustrates a block diagram of a host computing device hosting a plurality of VCIs having failure monitoring according to an example embodiment.

FIG. 3 illustrates one example implementation of a failure detection workflow for high availability of hosts. In this example, hosts 300, 302, 304 are in a cluster that has been configured for high availability (e.g., crash detection, verification, and remediation enabled). It should be appreciated that each of the hosts 300, 302, 304 are similarly configured to performed failure detection and remediation. Accordingly, a description of any one of the hosts 300, 302, 304 is similarly applicable to any other one of the other hosts 300, 302, 304.

The monitoring workflow in FIG. 3 includes monitoring for guest OS crashes and/or kernel dumps in a VCI via a crash detector and other modules executing in a hypervisor in each of the hosts 300, 302, 304. In one example, the remediating process includes remediating guest OS crashes in the VCI via vSphere® HA by VMware, Inc.

Host 300 is next described in particular. Host 300 may be a physical host or a virtualized host on which VCIs, such as VCIs 112, 114 shown in FIG. 1, execute. In this example, the VCIs are VMs 308, 310, 312, 314. The VMs 308, 310, 312, 314 are shown to be running different OSs. For example, VM 308 is executing a Windows® 8 or higher version OS, VM 310 is executing a Windows® 7 or lower version OS, VM 312 is executing a Mac® OS, and VM 312 is executing a Linux® OS.

The host 300 includes a crash detector 306 or other module or component operable to detect failures on the VMs 308, 310, 312 and 314 across various different OSs. It should be appreciated that the host 300 may only have one of the VMs 308, 310, 312 and 314 running and is configurable to monitor for failures in any of the different OSs. The crash detector 306 continuously, periodically, or intermittently monitors the VMs 308, 310, 312 and 314 (that are present) to identify a failure condition, with or without the use of the heartbeat monitoring process described above. In a VMware, Inc. example, the crash detector 306 (which corresponds to crash detectors 116, 118 shown in FIG. 1) is operable as part of the VMware ESXi® Hypervisor.

As further described with respect to the flow charts, to detect a failure on the VM 308, the crash detector 306 monitors for a request to create a Windows® 8 (or higher version) Microsoft® Reserved Partition (MSR), which is identified by a central processing unit (CPU) identification (CPUID) instruction. The guest OS stores information in the MSR when a failure has occurred that may help describe the failure. The MSR is created, and the data stored therein, using an "enlightenment" hypercall in the OS. The enlightenment hypercall is a specialized virtualization-aware call provided by the OS. The crash detector 306 listens for, and intercepts, this enlightenment hypercall. Upon interception of the enlightenment hypercall (e.g., by a VM monitoring process executing in the hypervisor), the crash detector 306 sets a flag indicating OS failure, and obtains the data stored in the MSR corresponding to the crash. This data is forwarded to other modules associated with the high availability process (e.g., Hostd). In this way, the crash detector 306 monitors the VM 308 for an indication from the Windows® 8 (or higher version) OS that a failure condition has occurred, and sets a flag for other modules to process for remediation.

As further described with respect to the flow charts, to detect a failure on VM 310, the crash detector 306 monitors for a Windows® 7 (or lower version) BSoD that is displayed upon a guest crash. For example, the crash detector 306 monitors for the BSoD by detecting a switch to a video graphics array (VGA) display format and then performing a pattern match to content sent for display in the VGA display format to confirm that the BSoD has occurred. An example of a BSoD 400 is shown and described with respect to FIG. 4.

To detect a failure on VM 312, the crash detector 306 monitors for a Mac® OS write to firmware that occurs upon a guest crash. Specifically, the crash detector 306 detects a crash via a non-volatile random-access memory (NVRAM) crash signature module. For example, the crash detector 306 may intercept the write commands and confirm that the intercepted commands correspond to a crash condition. This intercepting may include determining the location in the firmware to which the write is to be performed to further confirm that the write corresponds to a crash condition. As should be appreciated, because the firmware is virtual, the write to the firmware can be trapped or otherwise intercepted.

To detect a failure on VM 314, the crash detector 306 monitors for a Linux® driver that writes out to a non-volatile location upon a guest crash. For example, for a Linux® guest OS, a pstore filesystem is mounted on VM 314 to write the crash information to persistent storage. The pstore filesystem stores kernel log or kernel panic messages that are created during a crash. In operation, the crash detector 306 in one example registers a hook to a kmsg_dump functionality, which is called during an OS crash. When the kmsg_dump call occurs, the crash detector 306 is notified and obtains the crash information stored in the pstore filesystem. This crash information is passed on to other HA modules. In this manner, the logging of crash information is intercepted by the hypervisor and interpreted as a crash.

Once the crash detector 306 concludes that a crash has occurred, the crash detector 306 passes information to other HA modules for remediation. For example, upon detecting a guest OS failure, in the VMware® platform the crash detector 306 posts the crash information as a Post Event in the Hostd 316 or other host agent, which posts the information to a vSphere® HA agent (illustrated as an HA Listener 318) executed by the VMware ESXi® Hypervisor. The HA Listener 318 listens for updates (e.g., logs or flags) posted by Hostd 316 to detect system failures. In some aspects, specific values are logged to certain registers and an internal host database is provided where those values are updated. This information is evaluated against a policy, such as vSphere® HA's LocalVmMonitoring policy, to determine the appropriate remediation.

For example, once a failure such as a system crash has been detected and verified at 320 as described herein, remediation of the failure is performed. For example, upon logging of a failure detected by the crash detector 306, which may include the setting of a flag indicating the detected failure, remediation of the failure is performed on VM 308, 310, 312 or 314 by the hypervisor such that the VM is restarted at 322, shut down, migrated, etc. In some examples, the restarting may be started immediately after the verified failure or may be delayed to allow for other actions to be performed (e.g., completion of a core dump to help ascertain why VM 308, 310, 312 or 314 failed) before restarting VM 308, 310, 312 or 314. However, as should be appreciated, different remediation processes may be performed based on administrative settings or policies.

Various VCI remediation actions include, but are not limited to resetting the VCI immediately, powering off the VCI immediately, waiting for the kernel dump to complete and then resetting the VCI, waiting for the kernel dump to complete and then powering off the VCI, and reverting the VCI to a last well-known state via a previously-saved snapshot selected by the user.

Figure 4:
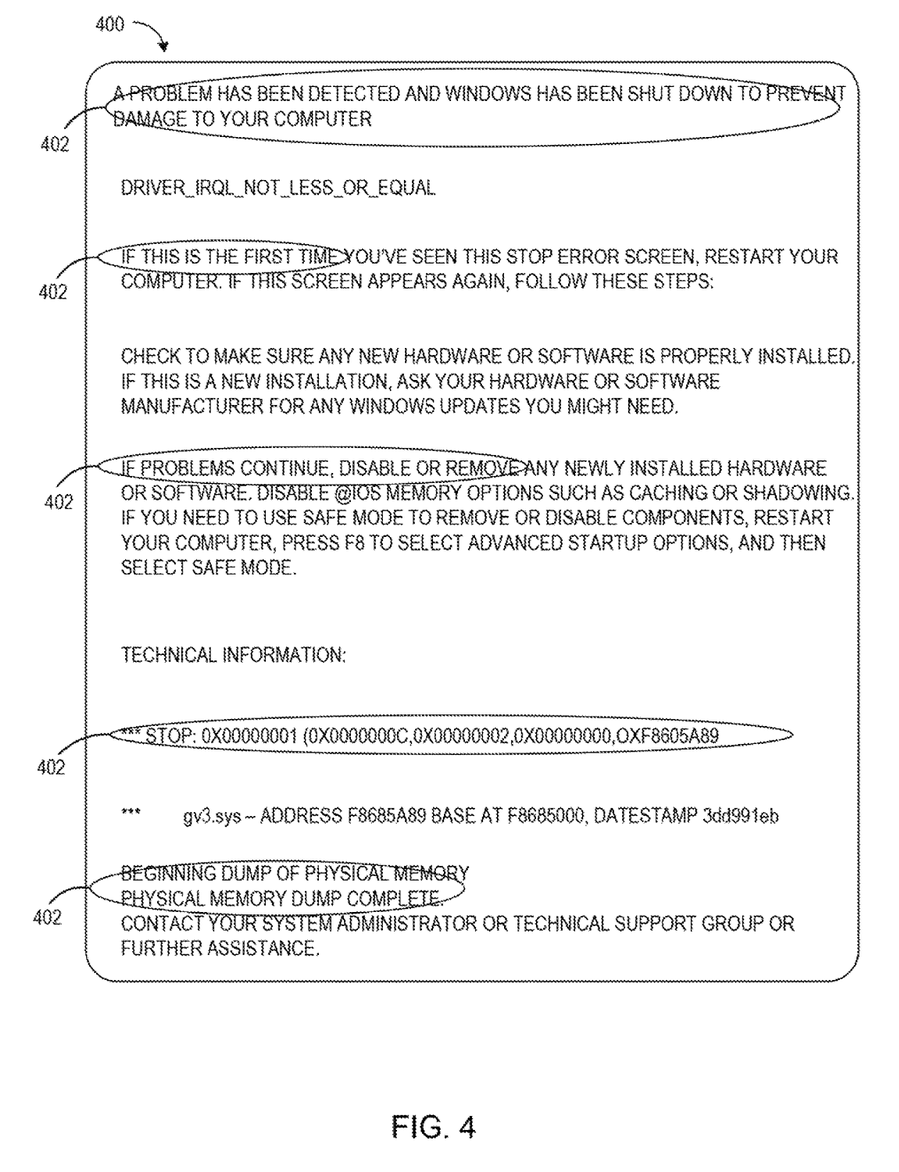
FIG. 4 illustrates a screen shot of a failure screen detected according to an example embodiment.

FIG. 4 illustrates an example BSoD 400 generated by a Windows® 8 (or later) OS executing in a VCI. The BSoD detector, which may be a part of a crash detector such as crash detector 306 in FIG. 3, performs pattern matching to confirm display of a BSoD. The pattern match includes comparing the contents last sent for display by the guest OS of the VCI against the contents of the known BSoD 400. In this manner, the existence of a BSoD may be confirmed, indicating that an OS crash has occurred.

The typical BSoD 400, as shown in FIG. 4, includes one or more portions such as portions 402 (e.g., five or six portions). The portions 402 correspond to text or image portions present on all BSoDs, and generally limited to BSoDs. For example, the portions 402 in some aspects correspond to text that in combination would only be present when a BSoD is displayed. Alternatively, or in addition, other characteristics or properties of a candidate BSoD may be analyzed to confirm that what is being displayed corresponds to the known BSoD 400. For example, BSoD information corresponding to color (e.g., blue color) or font size also may be analyzed.

In this manner, the pattern match process compares the acquired display data to an existing set of BSoD data. This includes parsing the acquired display data for fields, strings and/or values, and attempting to match those to the known BSoD 400. Each of these parsed fields is compared to a respective portion 402. For example, one known portion 402 may begin on the first line and include the string "A problem has been detected". If a parsed field from the first line of a candidate BSoD also includes this string, that increases a weight value or other indication that the candidate BSoD is actually a BSoD such as BSoD 400.

By determining whether other parsed fields of the candidate BSoD likewise correlate or match to the known BSoD 400, the weight value is adjusted until a final weight value is obtained. If the final weight value is above a pre-defined threshold (e.g., 75%), then the crash detector concludes that the guest OS has crashed.

Instead of comparing the candidate BSoD against the known BSoD 400, in another example, expected data from the known BSoD 400 is searched for in the candidate BSoD. For example, each of the data lines corresponding to the selected portions 402 are compared against the candidate BSoD to determine whether expected patterns or values corresponding to the BSoD 400 are present.

Figure 5:
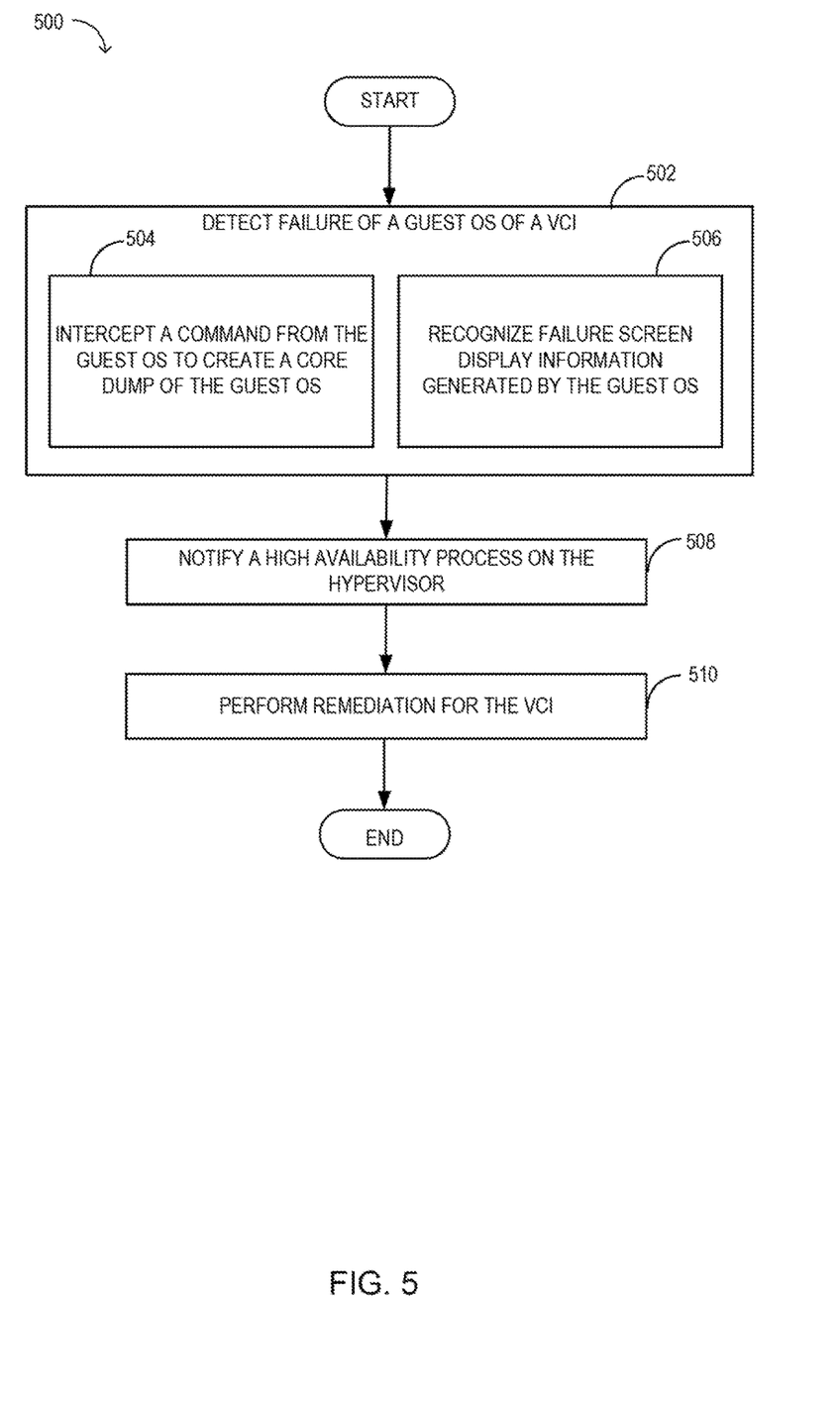
FIG. 5 is a flowchart illustrating a process for determining and verifying failure of a VCI.

FIG. 5 is a flowchart illustrating operations performed by a process for determining and verifying failure of a VCI. The example operations illustrated in FIG. 5 may be performed by agents or other processes executing on the VCI. In this example, a method 500 is performed by a hypervisor executing on the VCI to detect a failure of the VCI, such as a guest OS crash. In one example, this process occurs without use heartbeating and I/O cycle monitoring that would add time to the detection and verification of the crash.

In some aspects, the method 500 includes one or more workflows, including a monitoring workflow and a remediation workflow. For example, on the VMware® platform, the monitoring workflow includes monitoring the VCI by the VMware ESXi® Hypervisor to detect a guest OS crash on the VCI. The remediation process generally includes remediating the failure of the VCI via vSphere® HA, which includes modules that executed by the hypervisor. As part of an initial setup process, a user can select one or more VCIs for HA monitoring and set a remediation policy. The remediation policy includes whether detected crashes are to be immediately remediated, or if remediation is to occur after the core dump has completed. The policy has alternatives such as whether to select a previously-saved snapshot to which the crashed VCI will be restored. Other policy settings are contemplated.

More particularly, at 502, the hypervisor monitors for failure of the VCI. For example, the hypervisor monitors for failure of a guest OS of the VCI executing on a host, wherein the host is in a cluster that has been configured to support high availability. The detection of the failure is performed using a workflow specific to the type and version of the guest OS for the VCI. Thus, while different VCIs may have different guest OSs, the method 500 is able to detect failures across various different OSs. That is, the hypervisor includes logic to handle crash detection for different OSs. For example, the detection of the failure is based on whether the guest OS is a Windows® 8 or higher version OS, a Windows® 7 or lower version OS, a Mac® OS, or a Linux® OS.

In one example, the hypervisor detects failure of the guest OS of the VCI at 504 by intercepting a command from the guest OS to create a core dump of the guest OS. The guest OS issues this particular command in response to failure of the guest OS. For example, in one guest OS version (e.g., Windows® 8 or higher), the command from the guest OS to create the core dump is a hypercall from the guest OS to the hypervisor to create a reserved partition for storage of the core dump. In another example, in another guest OS version (e.g., Linux® OS), the command from the guest OS to create the core dump is a write of the core dump to a file system mounted as a virtual disk on the VCI. In another example, in another guest OS version (e.g., Mac® OS), the command from the guest OS to create the core dump is a write of the core dump to firmware or other NVRAM. The hypervisor is able to intercept each of these commands to infer that the guest OS has crashed. The monitoring may be performed continuously or periodically to detect a failure condition (by intercepting a command) without the use of a heartbeat monitoring process. In some aspects, the frequency of monitoring may change based on different factors, such as network usage, number of previously detected failures, etc.

Alternatively or in addition, failure of the guest OS of the VCI includes, at 506, recognizing failure screen display information generated by the guest OS. For example, the failure screen display information is recognized by detecting a display switch to a VGA format. That is, the guest OS issues a command to display content in the VGA format. Pattern matching is then performed by comparing selected portions of the displayed content in the VGA format to known display content (e.g., known failure screen display information) that is typically displayed upon failure of the guest OS to identify a match. In one aspect, the selected portions include strings with values that correspond to the BSoD (e.g., see BSoD 400 in FIG. 4).

Thus, different guest OS crashes of the VCI may be identified based on different workflows. The failure of the guest OS is detected by identifying a guest OS version and based on the identification of the guest OS version, determining whether to intercept the command from the guest OS to create a core dump, or recognize the failure screen display information generated by the guest OS.

In response to the detection of the failure of the guest OS of the VCI, a notification is provided to the high availability process on the hypervisor at 508. This notification occurs without waiting for heartbeating or I/O monitoring cycles to confirm that a failure has occurred. In this manner, the failure of the guest OS of the VCI is more quickly confirmed to enable remediation.

At 510, remediation for the VCI is performed by the high availability process on the hypervisor. For example, remediation for the VCI may be performed by one or more of the following: resetting or powering off the VCI, waiting for the core dump to complete and then resetting or powering off the VCI, and restoring a state of the VCI by reverting the VCI to a previously-saved snapshot of the VCI. The remediation action to be performed may have a temporal component defining when the action is to be performed (e.g., how long to wait, if at all, for a core dump to complete before performing the action). In one aspect, the remediation is performed based on user or administrative defined policies.

Figure 6:
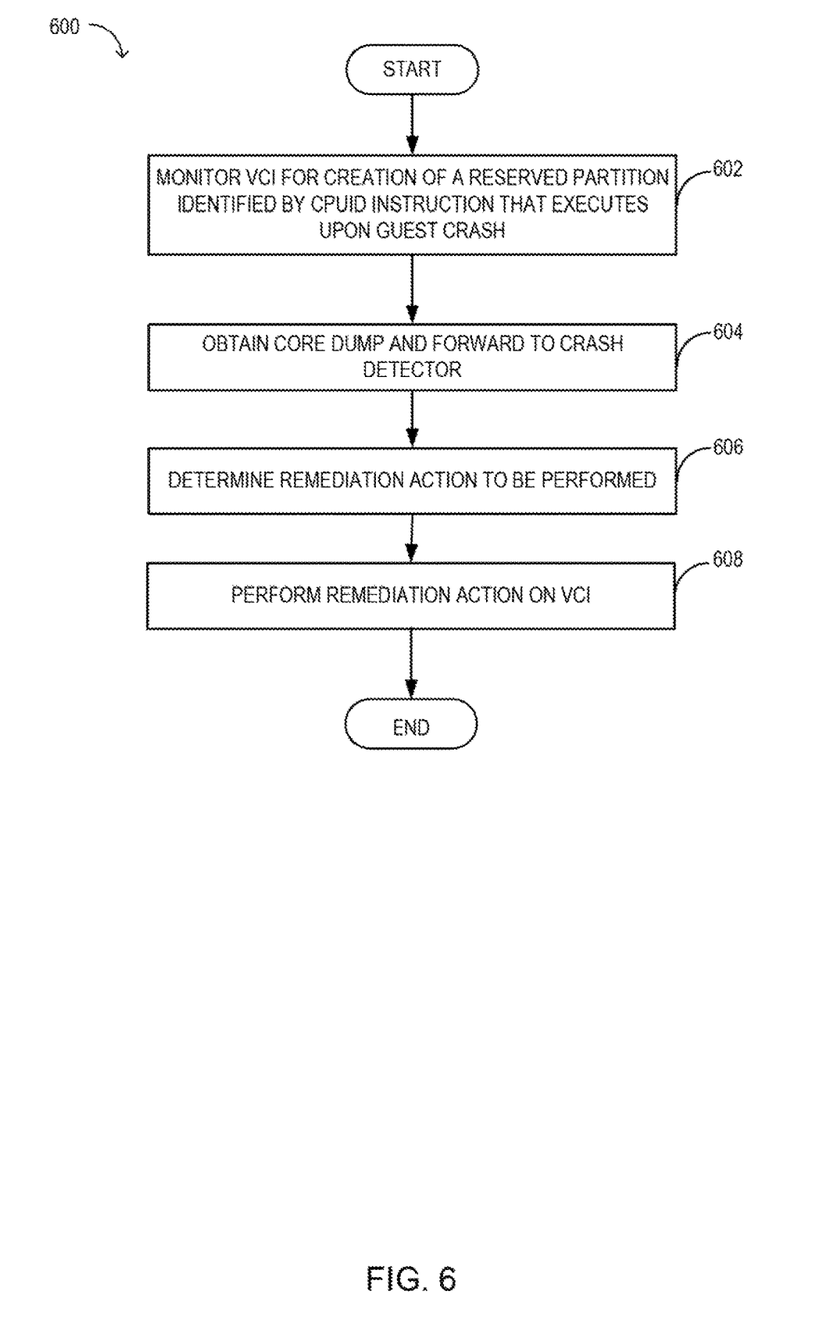
FIG. 6 is a flowchart illustrating another process for determining and verifying failure of a VCI.

FIG. 6 is a flowchart that shows another example process for determining and verifying failure of a VCI, which defines a specific workflow for a particular guest OS version. The example operations illustrated in FIG. 6 may be performed by agents or other processes executing on the VCI. In this example, a method 600 is performed by a hypervisor to detect a guest OS crash, and is particularly related to detection of a failure of a VCI having a Windows® 8 or higher guest OS version. The method 600 may be performed and is operable on the VMware® platform, such as part of the VMware ESXi® Hypervisor to monitor for guest OS crashes.

At 602, one or more VCIs are monitored for a guest OS crash condition by monitoring, listening, detecting, intercepting, or otherwise becoming aware of a request for creation of a reserved partition by a command that is issued in the event of a guest OS crash. In one example, the hypervisor monitors for creation of an MSR by an enlightenment hypercall, where the enlightenment hypercall is issued in the event of a guest OS crash. The instruction corresponding to the request is identifiable by a CPUID and, if the instruction correlates to the hypercall, the hypervisor concludes that a guest OS crash has occurred. This conclusion results in a flag being set indicating that the guest OS has crashed.

There may be an additional, optional hypervisor in some implementations. For example, with a VCI running Windows® 10 OS, one hypervisor (e.g., Hyper-V) may run on another hypervisor (e.g., VMware® ESX). The hypercall between Windows® 10 OS and VMware ESX is intercepted by the disclosure in this example.

After confirming that the CPUID of the instruction that created the core dump matches an instruction that is known to execute in the event of a guest OS crash, the core dump is obtained and forwarded to a crash detector (e.g., the crash detector 116, 118 shown in FIG. 1) at 604.

At 606, a determination is made as to the remediation action to be performed to address the guest OS crash. For example, a determination is made based on one or more policy settings as to whether the VCI should be reset or powered off immediately, should be reset or powered off after a core dump is completed, or should be reverted back to the last well known or healthy state via a previously-saved snapshot selected by the user. Other remediation actions are contemplated by the present disclosure, such as based on specific administrative or network policies.

At 608, the remediation action is performed on the VCI. As discussed above, the end result in some instances is that the VCI is either reset or powered off, which may occur immediately or after a delay or defined time period. The action to be taken may be based on a required latency in restart, customer requirements, or other factors.

Figure 7:
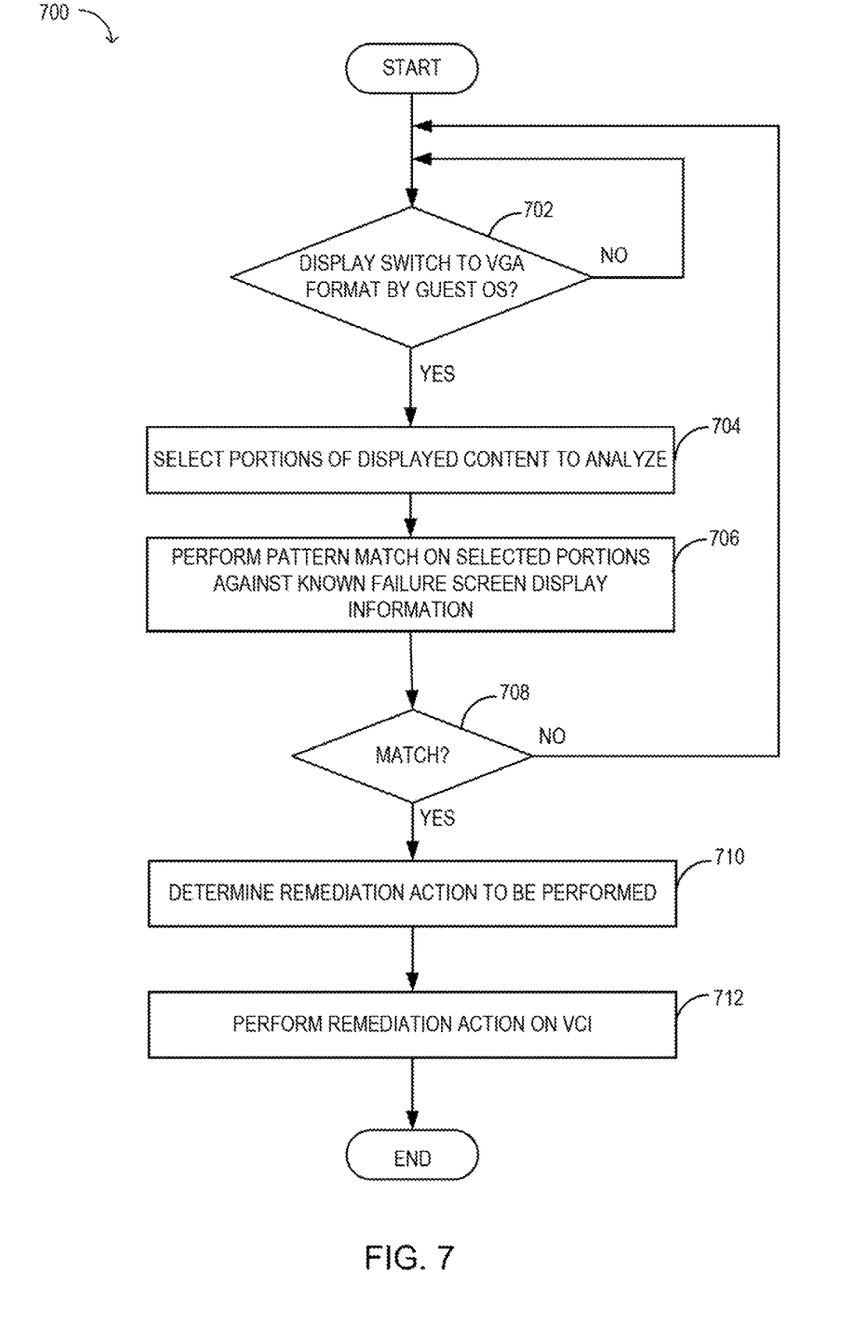
FIG. 7 is a flowchart illustrating another process for determining and verifying failure of a VCI.

FIG. 7 is a flowchart that shows another example process for determining and verifying failure of a VCI, which defines a specific workflow for a particular guest OS version. The example operations illustrated in FIG. 7 may be performed by agents or other processes executing on the VCI. In this example, a method 700 is performed by a hypervisor to detect a failure of the VCI, such as a guest OS crash, and is particularly related to detection of a failure of a Windows® 7 or lower guest OS version. In a specific example, the method 700 may be performed and is operable on the VMware® platform, such as part of the VMware ESXi® Hypervisor.

At 702, a determination is made whether the guest OS has requested to display content in a VGA format. For example, the VCI is monitored to determine whether the display has switched to a VGA display setting or mode. This determination may be made based on known control commands for switching the display mode or detected display settings that were changed in the guest OS. This switch to a VGA format in combination with other display characteristic (as discussed herein) indicates that the BSoD (or other failure screen) is desired to be displayed by the guest OS.

If the display has not been switched to a VGA format, monitoring for this switch continues. If a display switch to VGA format is detected, then portions of the displayed content to be analyzed are selected at 704. For example, portions on the display (being displayed in VGA format) are selected for analysis to determine whether that the VCI has crashed. In one example, data from the selected portions is used to determine whether the selected portion correspond to portions of a known BSoD. The portions may be selected using different methods, which may include random or predefined locations where information relating to a crash that is typically displayed on a known BSoD would be present (e.g., known failure screen display information). The number, size, configuration and locations of the portions may be varied, such as based on the version of the Windows® OS and the expected location of text to confirm that the BSoD has been displayed. Thus, in some aspects, the portions correspond to text or image portions that would typically be present on, and unique to, the BSoD.

At 706, a pattern match is performed on the selected portions against known failure screen display information. In some aspects, the pattern match process includes analyzing the acquired display data with respect to an existing set of BSoD data and parsing the acquired display data for fields, strings and/or values that are consistent with and match the known BSoD data. The parsed data is analyzed to determine whether it matches expected patterns/values corresponding to the known BSoD. Thus, a pattern match on the contents of the display data are analyzed based on standard or expected pattern(s) for the BSoD (or other known failure screen display) to determine whether in fact a BSoD has been displayed, which would indicate a system failure. Thus, in this example, a "screen scrape" of the displayed message is performed to confirm that the BSoD (or other known failure screen) has been displayed. In this manner, a guest OS crash is determined.

Additionally, at 706, other characteristics or properties of the failure screen display may be analyzed to confirm that it is being displayed. For example, for the BSoD, BSoD data corresponding to color (e.g., blue color) or font size also may be analyzed.

At 708, a determination is made as to whether there is a match as a result of the comparison at 706. In some implementations, the match must be a 100% match of all selected portions against the known failure screen display information. In other aspects, a less than 100% match may be used, but having correspondence that is within a threshold level of confidence that a failure screen is being displayed (e.g., 75% confidence).

If a match is not confirmed at 708, then the hypervisor concludes that the guest OS has not crashed, and monitoring for a display switch to a VGA format continues. If a match is confirmed at 708, then a remediation action to be performed is determined at 710 and the remediation action is performed on the VCI at 712. For example, the determination of the remediation action may be performed as described at 606 in FIG. 6 and the remediation action may be performed as described at 608 in FIG. 6.

While FIGS. 6 and 7 describe processes that define workflows for monitoring and identifying guest OS crashes of VCIs, the disclosure may be implemented in connection with VCIs executing different OSs. As described herein, in a Mac® OS operating environment, the crash detection involves analysis based on a Mac® OSX kernel crash using an NVRAM crash signature module. In a Linux® OS operating environment, the crash detection involves analysis based on a Linux® driver that writes out to a non-volatile location, which executes upon a guest crash, as described in more detail herein. However, as should be appreciated, different monitoring and remediation processes within the scope of the disclosure may be performed for other OSs.

Exemplary Operating Environment

It should be understood that any of the examples described herein are non-limiting. As such, the present disclosure is not limited to any particular embodiments, aspects, concepts, structures, functionalities or examples described herein. Rather, the present disclosure may be used in various ways that provide benefits and advantages in virtualized computing environments in general.

While some virtualized embodiments are described with reference to VMs for clarity of description, the disclosure is operable with other forms of VCIs. A VCI may be a VM, a container, and/or any other type of virtualized computing instance.

Certain examples described herein involve a hardware abstraction layer on top of a host computer (e.g., server). The hardware abstraction layer allows multiple containers to share the hardware resource. These containers, isolated from each other, have at least a user application running therein. The hardware abstraction layer thus provides benefits of resource isolation and allocation among the containers. In some examples, VMs may be used alternatively or in addition to the containers, and hypervisors may be used for the hardware abstraction layer. In these examples, each VM generally includes a guest operating system in which at least one application runs.

For the container examples, it should be noted that the disclosure applies to any form of container, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The terms 'computer', 'server', 'computing device' and the like are used herein to refer to any device with processing capability such as a physical processor for executing computer program code or other instructions. Those skilled in the art will realize that such processing capabilities are incorporated into many different devices and therefore the terms 'computer', 'server', and 'computing device' each may include PCs, servers, laptop computers, mobile telephones (including smart phones), tablet computers, and many other devices.

Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for detecting a guest OS crash of a VCI, including exemplary means for detecting failure of the guest OS of the VCI by either intercepting a command from the guest OS to create a core dump of the guest OS, the guest OS issuing the command in response to failure of the guest OS, or recognizing failure screen display information generated by the guest OS, exemplary means for notifying a high availability process on the hypervisor in response to detecting the failure of the guest OS, and exemplary means for performing, by the high availability process on the hypervisor, remediation for the VCI.

The term "comprising" is used in this specification to mean including the feature(s) or act(s) followed thereafter, without excluding the presence of one or more additional features or acts.

What is claimed is:

1. A system for detecting a guest operating system (OS) crash of a virtual computing instance (VCI), said system comprising:
    at least one physical processor; and
    at least one memory comprising computer program code, the at least one memory and the computer program code configured to, with the at least one physical processor, cause the physical processor to at least:
        detect, by a hypervisor executing on a host, failure of the guest OS of the VCI, the VCI executing on the host in a cluster that has been configured for high availability, wherein detecting comprises:
            intercepting a command from the guest OS to create a core dump of the guest OS, the guest OS issuing the command in response to failure of the guest OS by intercepting a hypercall from the guest OS to the hypervisor to create a reserved partition in the guest operating system for storage of the core dump, the hypercall occurring when the guest OS crashes, or
            recognizing failure screen display information generated by the guest OS;
        in response to detecting the failure of the guest OS, notify a high availability process on the hypervisor; and
        perform, by the high availability process on the hypervisor, remediation for the VCI.

2. The system of claim 1, wherein the computer program code is configured to intercept the command from the guest OS to create the core dump by intercepting a command from the guest OS to write the core dump to a file system mounted on the VCI.

3. The system of claim 1, wherein the computer program code is configured to intercept the command from the guest OS to create the core dump by intercepting a command from the guest OS to write the core dump to firmware.

4. The system of claim 1, wherein the computer program code is configured to recognize failure screen display information by:
    detecting a display switch to a video graphics array (VGA) format, the guest OS displaying content in the VGA format; and
    performing pattern matching by comparing selected portions of the displayed content in the VGA format to known display content that is displayed upon failure of the guest OS to identify a match, the selected portions including strings with values.

5. The system of claim 1, wherein the computer program code is configured to detect failure of the guest OS by:
    identifying a guest OS version; and
    based on the identifying guest OS version, determining whether to intercept the command from the guest OS to create a core dump, or recognize the failure screen display information generated by the guest OS.

6. The system of claim 1, wherein the computer program code is configured to perform remediation for the VCI by one or more of the following: resetting or powering off the VCI, waiting for the core dump to complete and then resetting or powering off the VCI, and restoring a state of the VCI by reverting the VCI to a previously-saved snapshot of the VCI.

7. A method for detecting a guest operating system (OS) crash of a virtual computing instance (VCI), said method comprising:
  detecting, by a hypervisor executing on a host, failure of the guest OS of the VCI, the VCI executing on the host in a cluster that has been configured for high availability, wherein detecting comprises:
    intercepting a command from the guest OS to create a core dump of the guest OS, the guest OS issuing the command in response to failure of the guest OS by intercepting a hypercall from the guest OS to the hypervisor to create a reserved partition in the guest operating system for storage of the core dump, the hypercall occurring when the guest OS crashes, or
    recognizing failure screen display information generated by the guest OS;
  in response to detecting the failure of the guest OS, notifying a high availability process on the hypervisor; and
  performing, by the high availability process on the hypervisor, remediation for the VCI.

8. The method of claim 7, wherein intercepting a command from the guest OS to create a core dump comprises intercepting a command from the guest OS to write the core dump to a file system mounted on the VCI.

9. The method of claim 7, wherein intercepting a command from the guest OS to create a core dump comprises intercepting a command from the guest OS to write the core dump to firmware.

10. The method of claim 7, wherein recognizing failure screen display information comprises:
  detecting a display switch to a video graphics array (VGA) format, the guest OS displaying content in the VGA format; and
  performing pattern matching by comparing selected portions of the displayed content in the VGA format to known display content that is displayed upon failure of the guest OS to identify a match, the selected portions including strings with values.

11. The method of claim 7, wherein detecting failure of the guest OS comprises:
  identifying a guest OS version; and
  based on the identifying guest OS version, determining whether to intercept the command from the guest OS to create a core dump, or recognize the failure screen display information generated by the guest OS.

12. The method of claim 7, wherein performing remediation for the VCI comprises one or more of the following: resetting or powering off the VCI, waiting for the core dump to complete and then resetting or powering off the VCI, and restoring a state of the VCI by reverting the VCI to a previously-saved snapshot of the VCI.

13. One or more non-transitory computer storage media having computer-executable instructions that, upon execution by a processor, cause the processor to at least perform operations comprising:
  detecting, by a hypervisor executing on a host, failure of the guest OS of the VCI, the VCI executing on the host in a cluster that has been configured for high availability, wherein detecting comprises:
    intercepting a command from the guest OS to create a core dump of the guest OS, the guest OS issuing the command in response to failure of the guest OS by intercepting a hypercall from the guest OS to the hypervisor to create a reserved partition in the guest operating system for storage of the core dump, the hypercall occurring when the guest OS crashes, or
    recognizing failure screen display information generated by the guest OS;
  in response to detecting the failure of the guest OS, notifying a high availability process on the hypervisor; and
  performing, by the high availability process on the hypervisor, remediation for the VCI.

14. The one or more non-transitory computer storage media of claim 13, wherein intercepting a command from the guest OS to create a core dump comprises intercepting a hypercall from the guest OS to the hypervisor to create a reserved partition for storage of the core dump, the hypercall occurring when the guest OS crashes.

15. The one or more non-transitory computer storage media of claim 13, wherein intercepting a command from the guest OS to create a core dump comprises intercepting a command from the guest OS to write the core dump to firmware.

16. The one or more non-transitory computer storage media of claim 13, wherein recognizing failure screen display information comprises:
  detecting a display switch to a video graphics array (VGA) format, the guest OS displaying content in the VGA format; and
  performing pattern matching by comparing selected portions of the displayed content in the VGA format to known display content that is displayed upon failure of the guest OS to identify a match, the selected portions including strings with values.

17. The one or more non-transitory computer storage media of claim 13, wherein detecting failure of the guest OS comprises:
  identifying a guest OS version; and
  based on the identifying guest OS version, determining whether to intercept the command from the guest OS to create a core dump, or recognize the failure screen display information generated by the guest OS.

* * * * *